(12) United States Patent
Lin

(10) Patent No.: US 11,218,382 B2
(45) Date of Patent: Jan. 4, 2022

(54) QUALITY OF SERVICE MONITORING METHOD, DEVICE, AND SYSTEM

(71) Applicant: WANGSU SCIENCE & TECHNOLOGY CO., LTD., Shanghai (CN)

(72) Inventor: Minghuang Lin, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 81 days.

(21) Appl. No.: 16/615,762

(22) PCT Filed: Dec. 5, 2018

(86) PCT No.: PCT/CN2018/119358
§ 371 (c)(1),
(2) Date: Nov. 21, 2019

(87) PCT Pub. No.: WO2020/052110
PCT Pub. Date: Mar. 19, 2020

(65) Prior Publication Data
US 2021/0168049 A1    Jun. 3, 2021

(30) Foreign Application Priority Data
Sep. 12, 2018   (CN) .......................... 201811062791.5

(51) Int. Cl.
*H04L 12/26* (2006.01)
*H04L 12/24* (2006.01)

(52) U.S. Cl.
CPC ...... *H04L 41/5009* (2013.01); *H04L 41/0681* (2013.01); *H04L 43/0829* (2013.01); *H04L 43/12* (2013.01); *H04L 43/16* (2013.01)

(58) Field of Classification Search
None
See application file for complete search history.

(56) References Cited

U.S. PATENT DOCUMENTS 6,446,200 B1 *  9/2002  Ball ................... H04L 41/5038
                                                              713/1
7,061,919 B1 *  6/2006  Anschutz ............... H04L 47/10
                                                           370/395.43
(Continued)

FOREIGN PATENT DOCUMENTS

CN          102045209 A      5/2011
CN          102223260 A     10/2011
(Continued)

OTHER PUBLICATIONS

The World Intellectual Property Organization (WIPO) International Search Report and Written Opinion for PCT/CN2018/119358 dated Apr. 28, 2019 9 pages.
(Continued)

*Primary Examiner* — Ajit Patel

(57) ABSTRACT

Quality of service monitoring method, device and system are provided. The method includes receiving a data packet of a service. The data packet is generated during a service interaction between a first device and at least one second device. The method also includes determining a service type of the data packet based on an application layer message and/or a transmission layer message of the data packet. The method also includes determining a quality of service indicator according to the service type, and acquiring analysis data in the data packet according to the quality of service indicator. The method also includes determining the quality of service of the service based on the analysis data.

19 Claims, 5 Drawing Sheets

(56) References Cited

U.S. PATENT DOCUMENTS

| | | | |
|---|---|---|---|
| 7,929,450 B2* | 4/2011 | Dolganow | H04L 43/08 |
| | | | 370/249 |
| 9,398,475 B2* | 7/2016 | Zhang | H04W 4/00 |
| 10,667,193 B1* | 5/2020 | Marupaduga | H04W 36/22 |
| 2002/0091636 A1* | 7/2002 | Carroll Bullard | H04L 43/00 |
| | | | 705/40 |
| 2007/0165565 A1* | 7/2007 | Jung | H04L 47/2408 |
| | | | 370/329 |
| 2013/0019009 A1 | 1/2013 | Tremblay et al. | |
| 2013/0286868 A1* | 10/2013 | Oyman | H04W 24/06 |
| | | | 370/252 |
| 2014/0056182 A1* | 2/2014 | Chai | H04W 4/24 |
| | | | 370/259 |
| 2017/0126476 A1* | 5/2017 | Curtin | H04L 41/5009 |
| 2018/0027444 A1* | 1/2018 | Maria | H04W 28/0289 |
| | | | 370/235 |
| 2018/0075106 A1* | 3/2018 | Haver | H04L 43/0835 |
| 2018/0124629 A1* | 5/2018 | Wang | H04L 12/56 |
| 2018/0132130 A1* | 5/2018 | Maeder | H04L 43/067 |
| 2018/0152384 A1* | 5/2018 | Kakadia | H04L 43/12 |
| 2021/0058813 A1* | 2/2021 | Ratasuk | H04L 47/2408 |

FOREIGN PATENT DOCUMENTS

| | | |
|---|---|---|
| CN | 102752792 A | 10/2012 |
| CN | 102347860 B | 12/2014 |
| CN | 104283699 A | 1/2015 |
| CN | 107026766 A | 8/2017 |
| EP | 2787758 A1 | 10/2014 |
| JP | 2018137499 A | 8/2018 |

OTHER PUBLICATIONS

The China National Intellectual Property Administration (CNIPA) the China Search Report for 201811062791.5 dated Nov. 29, 2019 18 Pages.

* cited by examiner

QUALITY OF SERVICE MONITORING METHOD, DEVICE, AND SYSTEM

CROSS-REFERENCES TO RELATED APPLICATIONS

This application is a national phase entry under 35 U.S.C. § 371 of International Application No. PCT/CN2018/119358, filed on Dec. 5, 2018, which claims priority of Chinese patent application No. 201811062791.5, filed with the State Intellectual Property Office of P. R. China on Sep. 12, 2018, the entire contents of all of which are incorporated herein by reference in their entirety.

FIELD

The present disclosure generally relates to the field of Internet technologies and, more particularly, relates to a method, a device, and a system for monitoring quality of service (QoS).

BACKGROUND

With continuous development of Internet technologies, more industries are providing services through network, and network environment is becoming more complicated. Accordingly, quality of service needs to be monitored.

According to Open System Interconnection (OSI) model or TCP/IP reference model, operation of network communication may be divided into different layers. For example, accordingly the OSI model, operation of network communication may be divided into seven layers, including physical layer, data link layer, network layer, transmission layer, session layer, presentation layer, and application layer. That is, service data may be transmitted between different network nodes based on the seven-layer model. In a conventional quality of service (QoS) monitoring process, delay, packet loss rate, and network jitter of data packets at each network node may be monitored in network layer. When the delay of data packets is long, the packet loss rate is high, or the network jitter is abnormal, quality of service may be determined to be poor.

In the above QoS monitoring, abnormality in quality of service may be monitored only when the abnormality occurs in the network layer. If malfunction occurs at the application layer or the transmission layer in a service, the service may not be monitored. Accordingly, the malfunction may not be found and resolved in real time.

BRIEF SUMMARY OF THE DISCLOSURE

The present disclosure provides a quality of service (QoS) monitoring method, a QoS monitoring device and a QoS monitoring system, to realize a purpose of QoS monitoring at an application layer of a network, and timely detecting and solving malfunction.

A first aspect of the present disclosure provides a QoS monitoring method. The method includes:
determining a service type of a data packet based on an application layer message and/or a transmission layer message of the data packet, the data packet being generated during a service interaction between a first device and at least one second device;
determining a QoS indicator according to the service type, and acquiring analysis data in the data packet according to the QoS indicator; and
determining quality of service based on the analysis data.

In one embodiment, determining the service type of the data packet based on the application layer message and/or the transmission layer message of the data packet includes:
extracting feature keywords from the application layer message and/or the transmission layer message of the data packet; and
based on the feature keywords, determining the service type from an application layer feature database, the application layer feature database including feature keywords, service types, and their corresponding relationships.

In one embodiment, before determining the service type of the data packet based on the application layer message and/or the transmission layer message of the data packet, the method also includes receiving a data packet sent by a network node, the network node being connected between the first device and each of the at least one second device, and the data packet being obtained through the network node by mirroring a data packet between the first device and the at least one second device.

In one embodiment, before determining the service type of the data packet based on the application layer message and/or the transmission layer message of the data packet, the method also includes receiving a data packet transmitted between the first device and each of at least one the second device.

In one embodiment, after receiving the data packet, a receiving time of the data packet is recorded.

In one embodiment, the analysis data includes the receiving time.

In one embodiment, acquiring the analysis data in the data packet according to the QoS indicator includes:
determining an analysis data stream from all data packets belonging to the service type; and
obtaining the analysis data corresponding to the service type from the data packets included in the analysis data stream according to the QoS indicator.

In one embodiment, after determining the quality of service according to the QoS indicator, the method also includes monitoring the quality of service.

A second aspect of the present disclosure provides a QoS monitoring device. The device includes an analysis and monitoring module and a storage module. The analysis and monitoring module processes data packets received by the QoS monitoring device based on the first aspect or any feasible implementation of the first aspect. The storage module communicates with the analysis and monitoring module, stores an application layer feature database for inquiries by the analysis and monitoring module, and saves quality of service generated by the analysis and monitoring module.

A third aspect of the present disclosure provides a QoS monitoring system. The system includes a first device, at least one second device, and a QoS monitoring device. A computer program runs on the QoS monitoring device, and the computer program execute the above QoS monitoring method. In the system:
the QoS monitoring device is serially connected between the first device and the at least one second device; or
the quality service monitoring device is branched on any one of network nodes between the first device and the at least one second device.

A fourth of the present disclosure provides another QoS monitoring system. The system includes at least one first device, at least one second device, a central server, and at least one QoS monitoring device. A computer program runs on the QoS monitoring device, and the computer program execute the above QoS monitoring method. In the system:

each QoS monitoring device is connected to the central server, and uploads quality of service determined by the QoS monitoring device to the central server, and the center server monitors the quality of service uploaded by each QoS monitoring device; and one QoS monitoring device is connected in series between each first device and at the least one second device; or one QoS device is branched on any one of network nodes between each first device and the at least one second device.

In the QoS monitoring method, the QoS monitoring device and the QoS monitoring system provided by the present disclosure, the QoS monitoring device may obtain data packets transmitted between a first device and a second device in real time. Service types may be determined by analyzing application layer messages and/or transmission layer messages of the data packets. According to a QoS indicator corresponding to each service type, analysis data corresponding to each service type may be obtained from the data packets, and real-time quality of service of each service type may then be determined. Compared with a conventional quality monitoring technology, in the present disclosure, information of interactions between the first device and the second device may be obtained more quickly. Further, quality of service may be determined in different dimensions at an application layer or a transmission layer, providing a basis for subsequent analysis and monitoring. Accordingly, QoS monitoring may be performed at a wider scope and in more detail.

BRIEF DESCRIPTION OF THE DRAWINGS

To more clearly illustrate technical solutions of the present disclosure, accompanying drawings to be used in the description of the disclosed embodiments are briefly described hereinafter. Obviously, the drawings described below are merely some embodiments of the present disclosure. Other drawings derived from such drawings may be obtained by a person having ordinary skill in the art without creative labor.

DETAILED DESCRIPTION

Figure 1A:
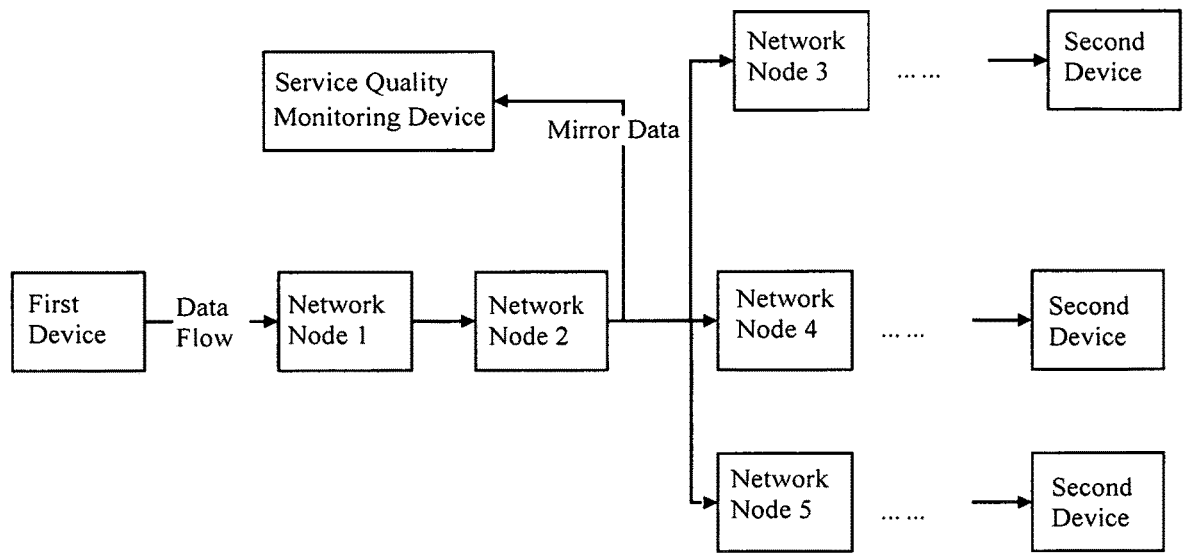
FIG. 1A illustrates a schematic diagram of a network architecture according to an embodiment of the present disclosure.

To make the objectives, technical solutions and advantages of the present disclosure more explicit, the technical solutions in the embodiments of the present disclosure are clearly and completely described in the following with reference to accompanying drawings in conjunction with the embodiments of the present disclosure. Obviously, described embodiments are a part of the embodiments of the present disclosure, but not all the embodiments of the present disclosure. All other embodiments obtained by a person having ordinary skill in the art based on the embodiments of the present disclosure without creative labor are within the scope of the present disclosure.

Sequence terms "first", "second", "third", "fourth", etc. (if present) in the description, the claims, and the drawings of the present disclosure are used to distinguish similar objects and are not used to describe a specific sequence or order. Data used in this way may be interchanged where appropriate. Accordingly, embodiments of the present disclosure may be realized in a sequence other than those illustrated or described in the description, the claims and the drawings of the present disclosure. In addition, terms "include" and "possess", and any variations thereof are intended to cover non-exclusive inclusions. For example, a process, a method, a system, a product, or equipment that comprises a series of steps or units is not necessarily limited to those steps or units that are clearly listed. The process, the method, the system, the product, or the equipment may include other steps or units that are not explicitly listed or that are inherent to the process, the method, the system, the product, or the equipment.

First, terms used in embodiments of the present disclosure are described below.

Term "service" generally refers to various services based on network operation. A service may be a specific application program, such as iQiyi, Tencent QQ, HUPU, etc., or a certain type of data service, such as video data download, video on demand, live video, image loading, mail sending and receiving, video or voice chat, game, web browsing, online trading, audio downloading, etc. A service may be specialized according to actual needs.

Terms "first device" and "second device" refer to devices that may establish network connection with each other and perform service request and response based on the network connection. A first device may be a user terminal device, including an electronic device such as a computer, a mobile phone, or a tablet computer. A first device may also be a proxy server disposed between a user terminal device and a source station server. A first device may receive traffic request from a user terminal device, and may provide proxy services such as acceleration. A second device may be a source station server that may responds to user requests, or may be a proxy server as described above.

Term "network node" refers to various intermediate devices, such as switches and routers, used in establishing network connection between a first device a second device.

Term "data packet" refers to data generated in a process of requesting or responding to a specific service. Data types included in a data packet may include signaling data and service data. The service data may include load data specifically for service interaction, such as picture data, video file data, and the like. The signaling data may include a quintuple and a signaling message. The quintuple may include source Internet Protocol (IP) address, source port, destination IP address, destination port, transmission layer protocol. Each data packet may include different layer protocol messages. For example, in a TCP/IP reference model, a data packet may include a network access layer message, an internetwork layer message, an application layer message and/or a transmission layer message. In different application scenarios, a certain layer message in a data packet may be empty or not included due to different purposes of data transmission or different types of protocols.

Term "quality of service indicator" refers to parameter types for identifying quality of service, including but not limited to Domain Name System (DNS) resolution time, Transmission Control Protocol (TCP) connection time, first byte arrival time, page resolution time of HyperText Transfer Protocol (HTTP), first screen loading time, average download rate, total download resource size, and total download time. Different types of services may have different QoS indicators.

Second, network architectures applicable to the embodiments of the present disclosure are described below.

In embodiments of the present disclosure, an execution entity may be a quality of service (QoS) monitoring device. The device may be implemented by using software, hardware, or a combination of software and hardware. The device may be connected to a network in a branching mode or a serial connection mode. FIGS. 1A, 1B, 1C and 1D illustrate exemplary network architectures consistent with the disclosed embodiments.

FIG. 1A illustrates a schematic diagram of a network architecture according to an embodiment of the present disclosure. As shown FIG. 1A, a QoS monitoring device may be connected in a branching mode, and this connection mode is also referred to as bypass monitoring.

Specifically, a first device may perform service interaction with a plurality of second devices, and a plurality of network nodes may be disposed between the first device and each of the second devices. In one embodiment, a QoS monitoring device may be branched on any one of the network nodes, and data transmitted between the first device and any one of the second devices may pass through the network node. That is, the QoS monitoring device may only need to connect to a designated mirror port of a network node, and obtain mirror data packets through the designated mirror port.

When a data packet flows through a network node connected with a bypass QoS monitoring device, the network node may mirror received data packets to the QoS monitoring device. The QoS monitoring device may determine QoS indicators according to received mirror data packets, and determines quality of service of according to the QoS indicators.

Figure 1B:
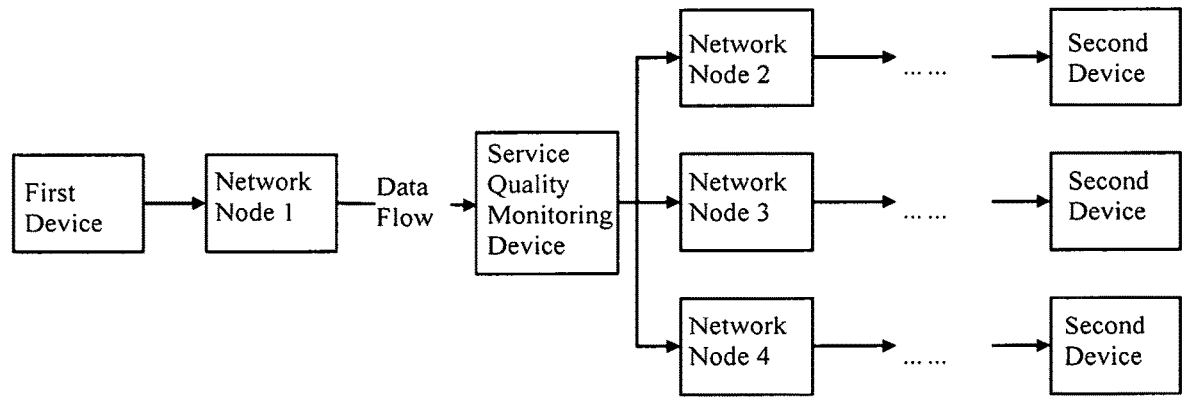
FIG. 1B illustrates a schematic diagram of a network architecture according to another embodiment of the present disclosure.

FIG. 1B illustrates a schematic diagram of a network architecture according to another embodiment of the present disclosure. As shown in FIG. 1B, a QoS monitoring device may be connected in series, and this access mode may be also referred to as a serial monitoring mode.

Specifically, a first device may perform service interaction with a plurality of second devices, and a plurality of network nodes may be disposed between the first device and each of the second devices. Data transmission between the first device and any one of the second devices may pass through the plurality of network nodes. In one embodiment, a QoS monitoring device may be connected between any two network nodes, or between the first device and a network node, or between the second devices and a network node. Data between the first device and any one of the second devices pass through the network nodes.

When data packets are transmitted between the first device and any one of the second devices, the data packets also flow through the QoS monitoring device. Accordingly, the QoS monitoring device may determine QoS indicators based on the received data packets and determine quality of service based on the QoS indicators.

Figure 1C:
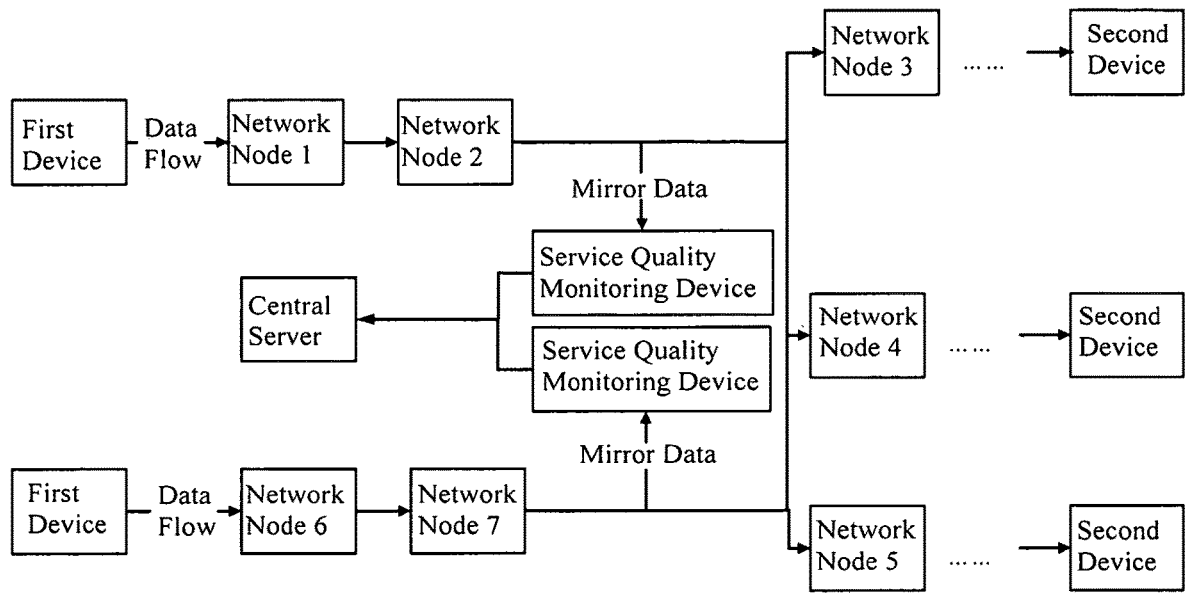
FIG. 1C illustrates a schematic diagram of a network architecture according to another embodiment of the present disclosure.

FIG. 1C illustrates a schematic diagram of a network architecture according to another embodiment of the present disclosure. As shown in FIG. 1C, QoS monitoring devices may be connected in a branching mode, and this connection mode may be also referred to as branching monitoring. Compared with FIG. 1A, there are a plurality of QoS monitoring devices and a plurality of first devices in FIG. 1C. One QoS monitoring device is connected in series between each of the first devices and at least one second device. Each QoS monitoring device is respectively connected to a central server, and may upload quality of service to the central server. The central server may monitor the quality of service uploaded by each of the QoS monitoring devices.

Figure 1D:
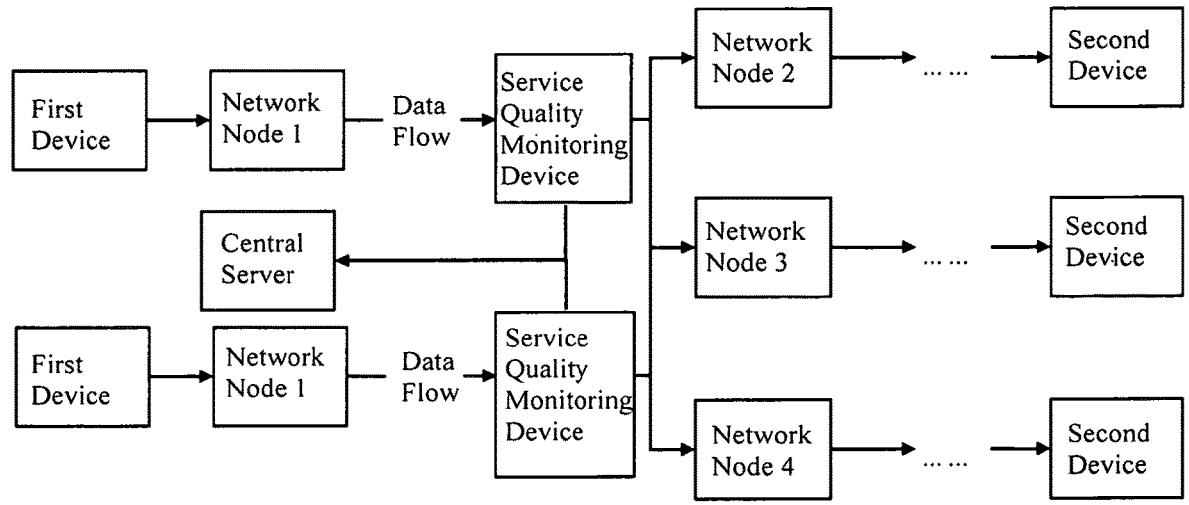
FIG. 1D illustrates a schematic diagram of a network architecture according to another embodiment of the present disclosure.

FIG. 1D illustrates a schematic diagram of a network architecture according to another embodiment of the present disclosure. As shown in FIG. 1D, QoS monitoring devices may be connected in series, and this connection mode is also referred to as a serial monitoring mode. Compared with FIG. 1B, there are a plurality of QoS monitoring devices and a plurality of first devices in FIG. 1D. A QoS monitoring device may be connected to any one of network nodes between each of the first devices and at least one second device. Each QoS monitoring device is respectively connected to a central server, and may upload quality of service to the central server. The central server may monitor the quality of service uploaded by each of the QoS monitoring devices.

It should be noted that the QoS monitoring devices in FIGS. 1A, 1B, 1C and 1D are independent of the network nodes. In some other embodiments, functions of network nodes may be integrated in QoS monitoring devices. That is, network nodes may be implemented through software, such as software switches and software routers.

Based on the network architectures shown in FIG. 1A to FIG. 1D, exemplary QoS monitoring methods consistent with the disclosed embodiments are described below in detail.

Figures 2, 3:
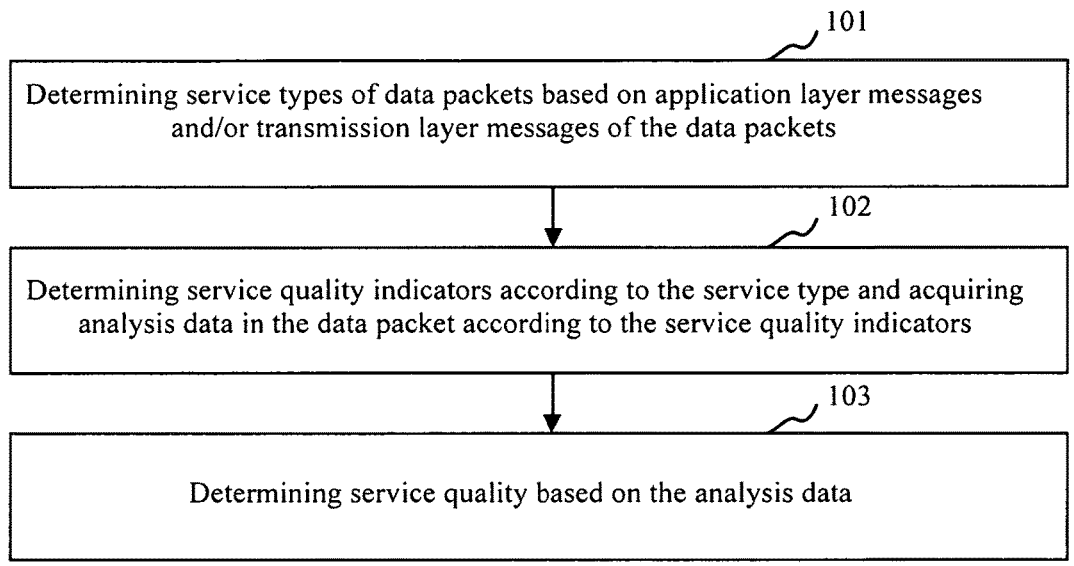
FIG. 2 illustrates a flowchart of a quality of service (QoS) monitoring method according to an embodiment of the present disclosure.
FIG. 3 illustrates a schematic diagram of extracting feature keywords in a QoS monitoring procedure according to an embodiment of the present disclosure.

FIG. 2 illustrates a flowchart of a QoS monitoring method according to an embodiment of the present disclosure. As shown in FIG. 2, an execution subject may be a QoS monitoring device, and the device may be implemented by software or a combination of software and hardware. As shown in FIG. 2, the QoS monitoring method includes Step 101, Step 102 and Step 103.

Step 101: determining service types of data packets based on application layer messages and/or transmission layer messages of the data packets, the data packets being generated during service interactions between a first device and at least one second device.

In one embodiment, the first device is a client terminal device, and the second device is a server of a service provider. After receiving an operation instruction from a user, the client terminal device may generate a service request data packet and send the service request data packet to a target server. After the target server receives the service request data packet, the target server may process the service request data packet, and send a response data packet to the client terminal device. In this way, there are packet interactions between the client terminal device and the server. Further, the client terminal device may interact with different servers at a same time, thus generating various types of data packets. The QoS monitoring device may obtain and analyze these data packets.

Accordingly, before Step 101, the QoS monitoring method may also include a step of receiving data packets transmitted between the first device and each of the second devices. A process for the QoS monitoring device to receive data packets is illustrated in FIGS. 1A, 1B, 1C and 1D.

Referring to FIG. 1A and FIG. 1C, when the QoS monitoring device is connected to a network node in a branching mode, all data packets sent by the first device or each second device and flowing through network node 2 or network node 7 may be mirrored by the network node to the QoS monitoring device. In this way, the QoS monitoring device may obtain all the data packets transmitted between the first device and each second device.

Referring to FIG. 1B and FIG. 1D, when a QoS monitoring device is connected in a series, the QoS monitoring device may be connected in series between the first device and each of the second devices. All data packets transmitted between the first device and each second device may flow through the QoS monitoring device, and thus the QoS monitoring device may receive all the data packets in real time.

It is worth noting that, no matter whether the QoS monitoring device is connected in a branching mode or in a serial connection mode, the QoS monitoring device may perform message parsing on received data packets in real time or in a preset cycle. Basic information contained in application layer messages and transmission layer messages obtained in message parsing may be saved for later QoS analysis. The basic information may include, but is not limited to, source IP address, source port, destination IP address, destination port number, transmission layer protocol, service data type, service data size, and the like. In addition, the QoS monitoring device may also record receiving time of each data packet.

Returning to FIG. 2, in Step 101, the QoS monitoring device may first parse the data packets, and extract application layer messages and transmission layer messages included in the data packets. The QoS monitoring device may then, based on the application layer messages and/or the transmission layer messages, determine service types of the data packets.

It is worth noting that the data packets received by the QoS monitoring device may use different transmission protocols, and may have different purposes. Accordingly, the data packets may only include application layer messages or transmission layer messages. In this case, the QoS monitoring device may only obtain the application layer messages or the transmission layer messages included the data packets by parsing the data packets.

Specifically, when the QoS monitoring device analyzes quality of services between the first device and the second device, the QoS monitoring device may analyze the services from different analysis dimensions. For example, a specific application program may be used as an analysis dimension, and transmission status of the data packets generated by the specific application program may be analyzed to determine a response speed or a QoS indicator of a server. Data types may also be used as an analysis dimension, and relevant status of various data types may be analyzed. The data types may include but not limited to video data, voice data, picture data, etc.

In the present disclosure, the different analysis dimensions may correspond to different service types, and the service types may be set by a developer according to analysis requirements. At a same time when service types are determined, identification methods of data packets corresponding to different service types may also be determined.

In one embodiment, the service type is an application program, and specifically the application program is WeChat. When analyzing quality of service for WeChat, data packets sent by WeChat or responding to WeChat may be identified from data packets, according to whether application packet names or specific port information of WeChat are included in application layer messages. Subsequent analysis may then be made based on identified data packets. Accordingly, with identification of service types of the data packets, relevant data packets may be quickly located in subsequent quality of service analysis.

In this step, the QoS monitoring device may perform Deep Packet Inspection (DPI) on data packets based on application layer messages and/or transmission layer messages of the data packets, and thus determine service types of the data packets.

Specifically, after obtaining the application layer messages and/or the transmission layer messages of the data packets, the QoS monitoring device may extract feature keywords from the application layer messages and/or the transmission layer messages. The feature keywords may include transmission layer protocol type, service data type, application layer protocol type, message header identifier, specific location field, and the like. By retrieving the feature keywords in an application layer feature database, service types corresponding to the data packets may be determined. The application layer feature database includes feature keywords, service types, and their corresponding relationships.

In one embodiment, the QoS monitoring device may pre-store an application layer feature database locally. The application layer feature database may be periodically acquired from a specific server. The QoS monitoring device may also analyze data packets received by itself to generate an application layer feature database.

Specifically, feature keywords in the application layer feature database may be obtained by analyzing application layer messages and/or transmission layer messages of a large amount of data packets. Application layer messages and/or transmission layer messages of a plurality of data packets of a target service type may be parsed and analyzed, and feature keywords that may be used to uniquely identify the target service type may be obtained. Collection of feature keywords may be performed by a specific server and updated to the QoS monitoring device. The collection of feature keywords may also be performed by other modules in the QoS monitoring device.

In the present disclosure, a service type of a data packet may be determined by whether application layer messages and/or transmission layer messages of the data packet include a feature keyword that may be used to identify a service type. Since different service types may correspond to different analysis dimensions, application layer messages and transmission layer messages of a same data packet may contain a plurality of feature keywords. Accordingly, one data packet may be identified as a plurality of service types.

In the present disclosure, after determining service types of a data packet, the QoS monitoring device may record all the service types of the data packet.

Step 102: determining a QoS indicator according to the service type, and acquiring analysis data in the data packet according to the QoS indicator.

Specifically, a QoS indicator may include various specific parameters for determining quality of service. Different service types may correspond to different QoS indicators, and one service type may correspond to a plurality of QoS indicators. Corresponding relationships between service types and QoS indicators may be preset and stored locally.

After Step 101, the QoS monitoring device may have completed data packet acquisition and determined service type of each data packet. The QoS monitoring device may then determine corresponding QoS indicator according to specific service type to be analyzed. The QoS monitoring device may further extract analytical data from the data packet according to the QoS indicator.

For example, when the service type is mail sending and receiving, the QoS indicator may include service request time, TCP connection establishment time, and first byte arrival time. Accordingly, when the service type of the data packet is determined to be a mail receiving and receiving service, the analysis data may include receiving time and TCP protocol identifier of the data packet, and whether service data are included in the data packet.

In one embodiment, the QoS monitoring device may first collect basic information when the QoS monitoring device receives data packets. The basic information may include source IP address, source port, destination IP address, destination port number, transmission layer protocol, service data type, service data size, etc., and receiving time of the data packet. In Step 102, the QoS monitoring device may further extract specific information according to corresponding QoS indicator of the data packet. Analysis data corresponding to the QoS indicator may be obtained from the basic information and the specific information.

In one embodiment, when the QoS monitoring device analyzes the application layer messages and/or the transmission layer messages of a data packet, basic information may be extracted and saved first. After a specific QoS indicator is determined, specific information may be extracted and saved for later analysis. In some other embodiments, basic information and specific information may be extracted and saved together after a corresponding QoS indicator is determined.

Analysis data corresponding to a QoS indicator may need to be obtained from a plurality of data packets. For example, analysis data corresponding request response time may need to be obtained from a request data packet and a response data packet responding to the request data packet. In the present disclosure, data packets having certain correlation and providing analysis data for a certain QoS indicator may be defined as an analysis data stream.

A QoS monitoring device may receive a large number of data packets in a period of time. When the QoS monitoring device acquires QoS indicators corresponding to a service type, data packets belonging to the service type may be filtered out first. Then, corresponding analysis data streams may be identified from the data packets based on the QoS indicators, and corresponding analysis data may be obtained based on the analysis data streams respectively.

Step 103: determining quality of service based on the analysis data.

After Step 101 and Step 102, the QoS indicator and the corresponding analysis data may have been determined, and the quality of service corresponding to the service type may then be analyzed based on the analysis data.

Specifically, in analyzing quality of service, a QoS indicator for evaluating quality of service may be determined first, and then corresponding analysis data based on the QoS indicator may be obtained. Finally, specific analysis data may be analyzed, and a specific quality of service may be determined.

Further, after the QoS monitoring device determines the quality of service corresponding to each service type, the quality of service may be monitored.

Specifically, after determining the quality of service, the QoS monitoring device may obtain service evaluation standards corresponding to each service type from a local or central server. The QoS monitoring device may then perform statistics, evaluation, and monitoring on the quality of service corresponding to each service type. For example, a preset threshold value may be used to determine whether a quality of service of a service type meets requirements. When the quality of service is lower than the preset threshold, warning information may be generated, and an alert may be issued.

It shows that, in the QoS monitoring method provided by the present disclosure, the QoS monitoring device may obtain data packets transmitted between a first device and a second device in real time. Service types may be determined by analyzing application layer messages and/or transmission layer messages of the data packets. According to QoS indicators corresponding to each service type, analysis data corresponding to each service type may be obtained from the data packets, and real-time quality of service of each service type may then be determined. Compared with a conventional quality monitoring technology, in the present disclosure, information of interactions between the first device and the second device may be obtained more quickly. Further, quality of service may be determined in different dimensions at the application layer or the transmission layer, providing a basis for subsequent analysis and monitoring. Accordingly, QoS monitoring may be performed in a wider scope and in more detail.

By taking the service type as video download as an example, steps of the foregoing QoS monitoring method are described below in detail.

QoS indicators for a service type pre-set as Youku video download may include TCP connection establishment time (ms), request time (ms), total download resource size (KB), total download time (ms), and average download rate (KB/s). The TCP connection establishment time (ms) refers to time T1 of three handshakes during a TCP connection establishment process between the first device and the second device. The request time (ms) refers to time T2 required by the first device to send an HTTP request to the second device. The total download resource size (KB) refers to a sum of sizes of all data packets. The total download time (ms) refers to time T3 from start of download to end of download. The average download rate (KB/s) refers to a ratio of the total download resource size to the total download time.

Feature keywords of a video download service may be stored in advance in an application layer feature database. The feature keywords of a video download service may include "youku", "HTTP/1.", "GET", "POST", "OPTIONS", "HEAD", "DELETE", "CONNECT", "PROPFIND", "REPORT", "mpeg", "x-mpeg", "mp4a", "mp4", "fly", "flash", "quicktime", etc.

After receiving data packets transmitted between the first device and the second device, the QoS monitoring device may extract feature keywords from the application layer messages and/or the transmission layer messages of the data packets. The QoS monitoring device may first determine whether the feature keywords includes "youku". If the feature keywords include "youku", the QoS monitoring device may first record that the service type of the data packet includes Youku application program. FIG. 3 illustrates a schematic diagram of extracting feature keywords in a QoS monitoring procedure according to an embodiment of the present disclosure. In FIG. 3, contents in small boxes are extracted feature keywords, for example, "get", "mp4", "http/1.", and so on.

Next, data packets related to the video download service may be determined according to the feature keywords of the data packets whose service type belongs to Youku, specifically, by matching the feature keywords. It is worth noting that, the data packets belonging to the Youku video download service received by the QoS monitoring device may include a plurality of different download requests. For example, some of the data packets may include download requests for movie A initiated by the first device to the second device, and some of the data packets may include download requests for drama B initiated by the first device to the second device. In other words, the data packets may belong to different data streams. Each data stream may include data packets generated when a TCP connection is established, data packets generated when video data are downloaded, and data packets generated when the TCP connection is disconnected. Accordingly, an analysis data stream to which each data packet belongs may need to be determined first from the data packets of the Youku video download service.

Specifically, an analysis data stream to which data packets belong may be determined based on whether quintuples are corresponding to same information, and whether feature keywords include same information.

After the analysis data stream is determined, sequence of the data packets may be determined according to receiving time of each data packet. By determining values of flag bits for Acknowledge (ACK) and Synchronize Sequence Numbers (SYN) in TCP messages, data packets may be determined, from which analysis data corresponding to the QoS indicator may be obtained.

To determine the TCP connection establishment time T1, data packets containing three handshake messages generated during establishment of the TCP connection may be determined from the analysis data flow. Difference in receiving time between a data packet corresponding to the first handshake and a data packet corresponding to the third handshake may be calculated and determined as quality of service for the TCP connection establishment time.

To determine the request time T2, the QoS monitoring device may receive an initial data packet generated when the first device sends an HTTP request to the second device for a first time after the TCP connection is established. Difference in receiving time between the initial data packet and the data packet corresponding to the third handshake during the establishment of the TCP connection may be taken as quality of service for the request time T2.

To determine the total download resource size, a sum of sizes of all data packets in the analysis data stream may be calculated as quality of service for the total download resource size.

To determine the total download time T3, difference in receiving time between the first data packet in the analysis data stream and the last data packet in the analysis data stream may be calculated, and taken as quality of service for the total download time.

To determine the average download rate, quality of service for the average download rate may be obtained by calculating a ratio of the total download resource size to the total download time.

With the above methods, based on the data packets received, the QoS monitoring device may analyze quality of service corresponding to each service type. Accordingly, based on the quality of service, the QoS monitoring device may perform evaluation, monitoring, prediction, analysis, etc. for the network architecture.

Figure 4:
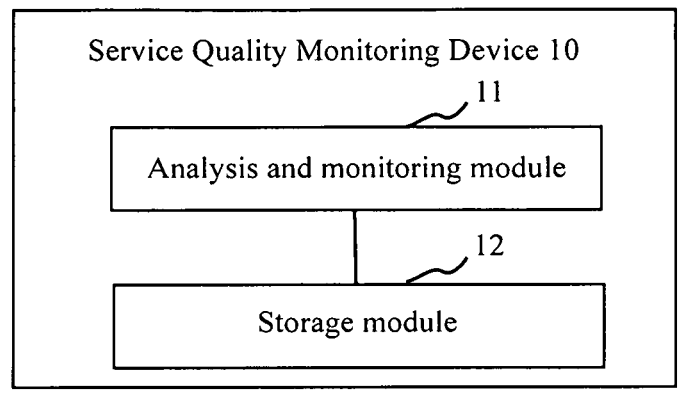
FIG. 4 illustrates a schematic structural diagram of a QoS monitoring device according to an embodiment of the present disclosure.

FIG. 4 illustrates a schematic structural diagram of a QoS monitoring device according to an embodiment of the present disclosure. As shown in FIG. 4, the QoS monitoring device 10 includes an analysis and monitoring module 11 and a storage module 12. The analysis and monitoring module 11 may process data packets received by the QoS monitoring device based on the QoS monitoring method described in foregoing embodiments or another feasible implementation approach. The storage module 12 may communicate with the analysis and monitoring module 11, and store an application layer feature database for inquiries by the analysis and monitoring module 11. The storage module 12 may save quality of service generated by the analysis and monitoring module 11.

In the QoS monitoring device shown in FIG. 4, the QoS monitoring device may obtain data packets transmitted between a first device and a second device in real time. Service types may be determined by analyzing application layer messages and/or transmission layer messages of the data packets. According to QoS indicators corresponding to each service type, analysis data corresponding to each service type may be obtained from the data packets, and real-time quality of service of each service type may then be determined. Compared with a conventional quality monitoring technology, in the present disclosure, information of interactions between the first device and the second device may be obtained more quickly. Further, quality of service may be determined in different dimensions at the application layer or the transmission layer, providing a basis for subsequent analysis and monitoring. Accordingly, QoS monitoring may be performed in a wider scope and in more detail.

Figure 5:
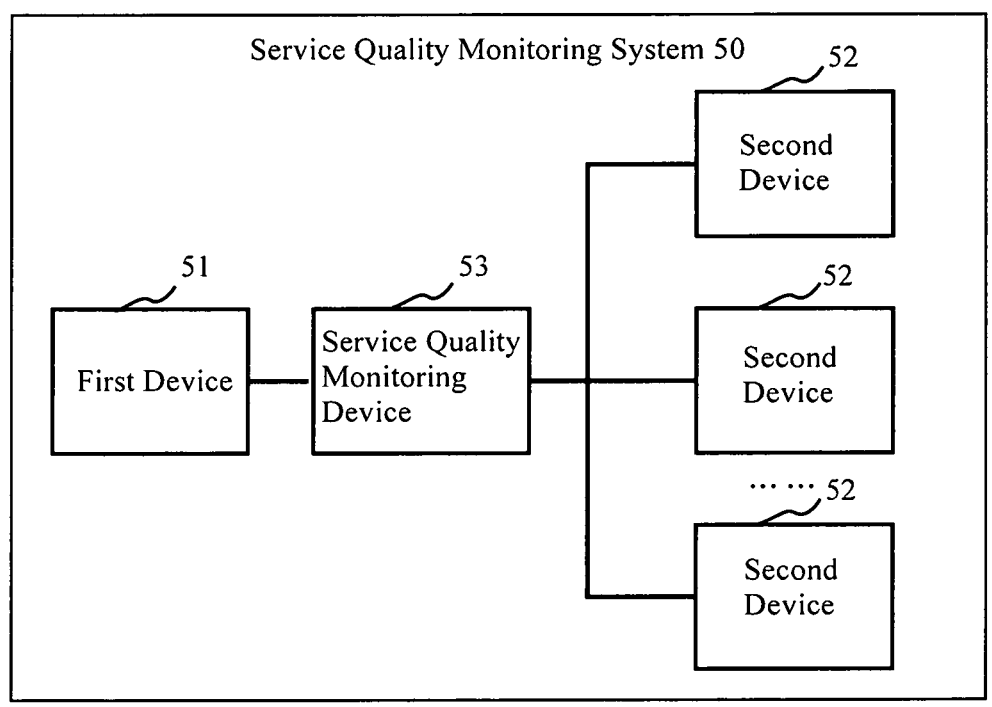
FIG. 5 illustrates a schematic structural diagram of a QoS monitoring system according to an embodiment of the present disclosure.

FIG. 5 illustrates a schematic structural diagram of a QoS monitoring system according to an embodiment of the present disclosure. As shown in FIG. 5, the QoS monitoring system 50 includes a first device 51, at least one second device 52, and a QoS monitoring device 53. A computer program may run on the QoS monitoring device, and the computer program may execute the QoS monitoring method provided by the embodiment illustrated in FIG. 2.

In one embodiment, the QoS monitoring device is serially connected between the first device 51 and the at least one second devices 52. In some other embodiments, the quality service monitoring device may be branched on any one of the network nodes between the first device 51 and the at least one second device 52.

Figure 6:
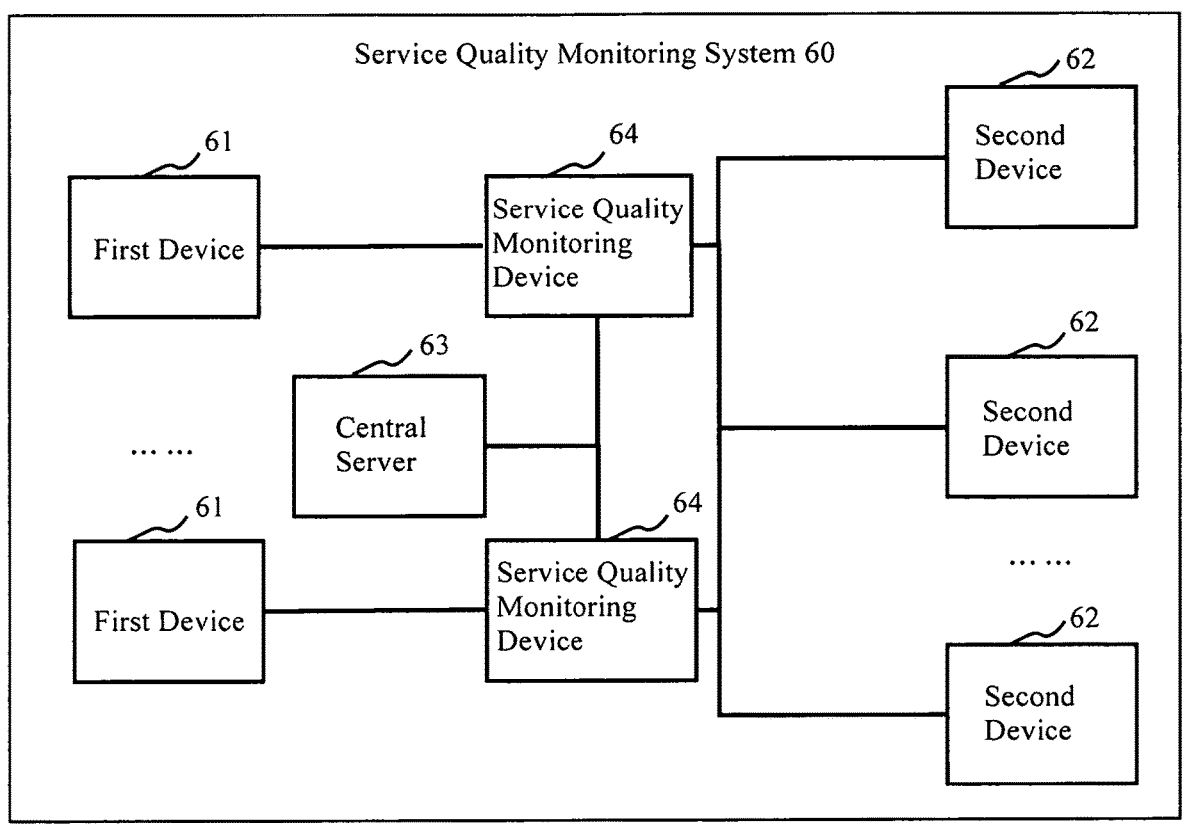
FIG. 6 illustrates a schematic structural diagram of a QoS monitoring system according to another embodiment of the present disclosure.

FIG. 6 illustrates a schematic structural diagram of a QoS monitoring system according to another embodiment of the present disclosure. As shown in FIG. 6, the QoS monitoring system 60 includes a plurality of first devices 61, a plurality of second devices 62, a central server 63, and a plurality of QoS monitoring devices 64. One QoS monitoring device 64 is connected in series between each of the first devices 61 and at least one second device 62. A computer program may run on the QoS monitoring device 64, and the computer program may execute the QoS monitoring method provided by the embodiment illustrated in FIG. 2.

In one embodiment, each QoS monitoring device 64 is connected to the central server 63, and uploads quality of service determined by the QoS monitoring device 64 to the central server 63. The center server 63 may monitor services based on the quality of service uploaded by each of the QoS monitoring devices 64.

In some other embodiments, the quality service monitoring device may be branched on any one of the network nodes between each of the first devices 61 and the at least one second device 62.

A person having ordinary skill in the art may understand that, all or part of steps in the embodiments in the present disclosure may be implemented by a program instructing associated hardware. The program may be stored in a computer readable storage medium. The program, when executed, may perform steps of the embodiments of the present disclosure. The storage medium may include various media that may store program codes, such as ROM, RAM, magnetic disk, or optical disk.

Finally, it should be noted that the foregoing embodiments are merely illustrative of technical solutions of the present disclosure, and are not intended to limit the technical solutions of the present disclosure. Though the present invention has been described in detail with reference to the foregoing embodiments, it should be understood by a person with ordinary skill in the art that the technical solutions described in the foregoing embodiments may be modified, or some or all of the technical solutions may be equivalently substituted. The modifications or substitutions do not make spirit of corresponding technical solutions depart from the scope of the technical solutions of the embodiments of the present disclosure.

What is claimed is:

1. A quality of service (QoS) monitoring method, comprising:
receiving a data packet of a service, wherein the data packet is generated during a service interaction between a first device and at least one second device;
determining a service type of the data packet based on an application layer message and/or a transmission layer message of the data packet;
determining a quality of service indicator according to the service type, and acquiring analysis data in the data packet according to the quality of service indicator; and
determining the quality of service based on the analysis data.

2. The method according to claim 1, wherein determining the service type of the data packet based on the application layer message and/or the transmission layer message of the data packet comprises:
extracting feature keywords from the application layer message and/or the transmission layer message of the data packet; and
based on the feature keywords, determining the service type from an application layer feature database, wherein feature keywords, service types, and their corresponding relationships are stored in the application layer feature database.

3. The method according to claim 1, wherein:
the data packet is sent by a network node, the network node is connected between the first device and each of the at least one second device, and
the data packet is obtained through the network node by mirroring the data packet between the first device and the at least one second device.

4. The method according to claim 1, wherein:
the data packet is transmitted between the first device and each of at least one the second device.

5. The method according to claim 1, wherein, after receiving the data packet, a receiving time of the data packet is recorded.

6. The method according to claim 5, wherein the analysis data includes the receiving time.

7. The method according to claim 1, wherein acquiring the analysis data in the data packet according to the quality of service indicator comprises:
determining an analysis data stream from all data packets belonging to the service type; and
obtaining the analysis data corresponding to the service from the data packets included in the analysis data stream according to the quality of service indicator.

8. The method according to claim 1, after determining the quality of service based on the analysis data, further comprising:
monitoring the quality of service.

9. A quality of service (QoS) monitoring device, wherein:
the QoS monitoring device is a hardware device connected between a first device and at least one second device, wherein, when a computer program runs on the QoS monitoring device to execute a QoS monitoring method, the QoS monitoring device is configured to:
receive a data packet of a service, wherein the data packet is generated during a service interaction between a first device and at least one second device;
determine a service type of the data packet based on an application layer message and/or a transmission layer message of the data packet;
determining a quality of service indicator according to the service type, and acquiring analysis data in the data packet according to the quality of service indicator; and
determining the quality of service of the service based on the analysis data.

10. A quality of service (QoS) monitoring system, comprising:
at least one first device,
at least one second device,
a central server, and
at least one QoS monitoring device each including the device according to claim 9, wherein:
each of the at least one QoS monitoring device is connected to the central server, and uploads quality of service determined by the QoS monitoring device to the central server, and the central server monitors the quality of service uploaded by each of the at least one QoS monitoring device; and
one QoS monitoring device is connected in series between the at least one second device and one of the at least one first device; or
one QoS monitoring device is branched on any one of network nodes between the at least one second device and one of the at least one first device.

11. The device according to claim 9, wherein to determine the service type of the data packet, the QoS monitoring device is further configured to:
extract feature keywords from the application layer message and/or the transmission layer message of the data packet; and
based on the feature keywords, determine the service type from an application layer feature database, wherein feature keywords, service types, and their corresponding relationships are stored in the application layer feature database.

12. The device according to claim 9, wherein:
the data packet is sent by a network node,
the network node is connected between the first device and each of the at least one second device, and
the data packet is obtained through the network node by mirroring the data packet between the first device and the at least one second device.

13. The device according to claim 9, wherein:
the data packet is transmitted between the first device and each of at least one the second device.

14. The device according to claim 9, wherein:
after the data packet is received, a receiving time of the data packet is recorded.

15. The device according to claim 14, wherein:
the analysis data includes the receiving time.

16. The device according to claim 9, wherein, to acquire the analysis data in the data packet according to the quality of service indicator, the QoS monitoring device is further configured to:
determining an analysis data stream from all data packets belonging to the service type; and
obtaining the analysis data corresponding to the service from the data packets included in the analysis data stream according to the quality of service indicator.

17. A non-transitory computer-readable storage medium, storing computer program for execution by a hardware device to:
receive a data packet of a service, wherein the data packet is generated during a service interaction between a first device and at least one second device;
determine a service type of the data packet based on an application layer message and/or a transmission layer message of the data packet;
determining a quality of service indicator according to the service type, and acquiring analysis data in the data packet according to the quality of service indicator; and
determining the quality of service of the service based on the analysis data.

18. The device according to claim 1, wherein, the first device is a client terminal device, and the second device is a server of a service provider.

19. The device according to claim 1, further comprising:
determining a plurality of service types of the data packet based on the application layer message and the transmission layer message of the data packet;
when analyzing the quality of service between the first device and the at least one second device, setting at least one service type that required to be analyzed;
determining the quality of service indicator according to each of the at least one service type that required to be analyzed, and acquiring the analysis data in the data packet belonging to each of the at least one service type that required to be analyzed according to the quality of service indicator;
determining the quality of service corresponding to each of the at least one service type that required to be analyzed based on the analysis data.

* * * * *